(12) United States Patent
Guo et al.

(10) Patent No.: US 12,191,967 B2
(45) Date of Patent: Jan. 7, 2025

(54) NON-UNIFORM BEAM SPATIAL MODULATION METHOD AND SYSTEM APPLICABLE TO MULTI-ANTENNA COMMUNICATION AND SENSING INTEGRATION

(71) Applicant: SHAN DONG UNIVERSITY, Jinan (CN)

(72) Inventors: Shuaishuai Guo, Jinan (CN); Dingyan Cong, Jinan (CN); Haixia Zhang, Jinan (CN)

(73) Assignee: SHAN DONG UNIVERSITY, Jinan (CN)

( * ) Notice: Subject to any disclaimer, the term of this patent is extended or adjusted under 35 U.S.C. 154(b) by 97 days.

(21) Appl. No.: 17/973,351

(22) Filed: Oct. 25, 2022

(65) Prior Publication Data

US 2023/0327739 A1   Oct. 12, 2023

(51) Int. Cl.
| | | |
|---|---|---|
| *H04B 7/0413* | (2017.01) | |
| *H04B 7/0408* | (2017.01) | |
| *H04B 7/06* | (2006.01) | |

(52) U.S. Cl.
CPC ....... *H04B 7/06952* (2023.05); *H04B 7/0408* (2013.01); *H04B 7/0413* (2013.01)

(58) Field of Classification Search
CPC ................ H04B 7/0413; H04B 7/0408; H04B 7/06952

See application file for complete search history.

(56) References Cited

U.S. PATENT DOCUMENTS

2018/0309481 A1 * 10/2018 Wu ........................ H04B 7/028

FOREIGN PATENT DOCUMENTS

| | | |
|---|---|---|
| CN | 101026468 A | 8/2007 |
| CN | 101651513 A | 2/2010 |
| CN | 102255833 A | 11/2011 |
| CN | 103281086 A | 9/2013 |
| CN | 106549690 A | 3/2017 |
| EP | 2104260 A1 | 9/2008 |
| WO | 2008157646 A2 | 12/2008 |
| WO | 2021249559 A1 | 12/2021 |

* cited by examiner

*Primary Examiner* — Rahel Guarino
(74) *Attorney, Agent, or Firm* — CBM PATENT CONSULTING, LLC

(57) ABSTRACT

A non-uniform beam spatial modulation method and system applicable to multi-antenna communication and sensing integration; the method includes: finding an ISAC beam that satisfies both sensing performance and communication performance, including: constructing a communication transmitting signal; constructing a communication receiving signal; constructing an upper bound of the integrated communication and sensing spectral efficiency of the non-uniform beam spatial modulation; constructing an objective function of the sensing performance; and finding a candidate beam matrix and a beam activation probability distribution where the spectrum frequency is maximum and the sensing performance is best; and finding a spectral efficiency of non-uniform beam spatial modulation by means of the ISAC beam. Under the condition of meeting the same sensing performance requirement, the spectral efficiency of the present invention is higher.

2 Claims, 8 Drawing Sheets

NON-UNIFORM BEAM SPATIAL MODULATION METHOD AND SYSTEM APPLICABLE TO MULTI-ANTENNA COMMUNICATION AND SENSING INTEGRATION

CROSS REFERENCES

This application claims priority to Chinese Patent Application Ser. No. CN202210215335.X filed 7 Mar. 2022.

FIELD OF THE INVENTION

The present invention relates to a non-uniform beam spatial modulation method and system applicable to multi-antenna communication and sensing integration, and belongs to the technical field of wireless communications.

BACKGROUND OF THE INVENTION

With the deployment of a fifth-generation (5G) mobile communication network, researches on a sixth-generation (6G) mobile communication network have been put on the agenda worldwide. Integrating the sensing capability into a future mobile communication network is one of the important directions of upgrading the current mobile communication network. As an essential feature, sensing will expand the capabilities of a future mobile network, which can facilitate many potential applications including an intelligent transportation system, a smart factory and city, health care, etc. [F. Liu, C. Masouros, A. P. Petropulu, H. Griffiths and L. Hanzo, "Joint Radar and Communication Design: Applications, State-of-the-Art, and the Road Ahead," in IEEE Transactions on Communications, vol. 68, no. 6, pp. 3834-3862, June 2020]. Over the past few decades, sensing and communication systems always existed independently and grew concurrently despite although they had many commonalities in aspects of a transceiver structure, a radio frequency (RF) front-end design, a signal processing algorithm, and the like. An Integrated Sensing and Communication (ISAC) system that shares hardware and saves spectrum and energy resources can reduce radio frequency spectrum congestion and improve efficiency, and has received extensive attention in recent years. As one of the key technologies, an antenna array has been widely used in existing independent sensing and communication systems. A multi-antenna technology can support narrow beam forming to compensate for high path loss associated with a high frequency band (such as a millimeter wave frequency band). In addition, multiple antennas also provide more degrees of freedom for better communication and sensing performance.

In a communication system, a space modulation technology has been born in a multi-antenna background. Spatial modulation is a novel communication modulation technology based on a switching mechanism. By means of activating different antennas or beams in different time slots, a spatial domain and an amplitude/phase domain are used to transmit information simultaneously, thereby improving the spectral efficiency. Compared with a traditional multi-antenna technology, the spatial modulation only uses a small number of radio frequency links, which has the advantages of low hardware cost, high energy efficiency and low system complexity, and has a great application prospect in a future communication system [R. Y. Mesleh, H. Haas, S. Sinanovic, C. W. Ahn and S. Yun, "Spatial Modulation," IEEE Transactions on Vehicular Technology, vol. 57, no. 4, pp. 2228-2241, 2008.].

In the early design of a multi-antenna ISAC system, a beam of the system was fixed within coherence time, and information bits could only be carried by data symbols, so that the spectral frequency cannot be additionally increased.

SUMMARY OF THE INVENTION

In view of the prior art, the present invention provides a non-uniform beam spatial modulation method applicable to multi-antenna communication and sensing integration. Specifically, a plurality of beams are designed within one coherence time to form a beam set, and one of the beams is selected, according to an information bit to be transmitted, to be activated within each symbol transmission time. By means of this design, beam numbers are used to carry information other than data symbols, which improves the spectral efficiency. Compared with the existing design scheme, an ISAC system designed in this way can improve the communication spectral efficiency under the condition that it also meets a requirement for sensing performance. By means of modifying a compromise factor between communication and sensing, under the condition of satisfying the same communication spectral efficiency, the beam design scheme of the present invention has better sensing performance than that of the existing scheme.

The present invention further provides a non-uniform beam spatial modulation system applicable to multi-antenna communication and sensing integration.

The technical schemes of the present invention are as follows.

A non-uniform beam spatial modulation method applicable to multi-antenna communication and sensing integration includes:
  finding an ISAC beam that satisfies both sensing performance and communication performance; and
  finding a spectral efficiency of non-uniform beam spatial modulation by means of the ISAC beam, and completing the non-uniform beam spatial modulation.

The finding an ISAC beam that satisfies both sensing performance and communication performance includes:
  constructing a communication transmitting signal; constructing a communication receiving signal; constructing an upper bound of the integrated communication and sensing spectral efficiency of the non-uniform beam spatial modulation; constructing an objective function of the sensing performance; and finding a candidate beam matrix and a beam activation probability distribution where the spectrum frequency is maximum and the sensing performance is best.

Preferably according to the present invention, the above-mentioned non-uniform beam spatial modulation method is applicable to a multiple-input multiple-output communication system. The multiple-input multiple-output communication system includes $N_t$ transmitting-side antennas and $N_r$ receiving-side antennas, and the number of data streams to be transmitted is $N_s$.

At a transmitting side, an information bit sequence b to be sent is divided into two parts: $b_1$ and $b_2$.

$b_1$ is a spatial modulation portion, which is mapped to a beam matrix $F_i \in \mathcal{F}$ with a dimension of $N_t \times N_s$; the beam matrix $F_i$ satisfies probability distribution $p(F=F_i)=p_i$; p represents a probability distribution; $F=F_i$ indicates that $F_i$ is activated; and $p_i$ is a probability that each beam matrix is activated.

$b_2$ is a data modulation portion, which is mapped to a symbol vector s with a dimension of $N_s \times 1$; and s satisfies a constraint condition expectation mean $$\mathbb{E}[ss^H] = \frac{1}{N_s}I_{N_s}.$$

Preferably according to the present invention, the constructing a communication transmitting signal means that once the beam matrix $F_i$ is selected, a vector of the communication transmitting signal is expressed as formula (I):

$$x = F_i s, \quad (I)$$

In formula (I), a normalized transmitting power satisfies $\|F_i\|_F^2 = N_s$.

Preferably according to the present invention, the constructing a communication receiving signal means that the communication receiving signal received by a communication receiver through a wireless channel is expressed as formula (II):

$$y = \sqrt{\rho}HF_i s + n. \quad (II)$$

In formula (II), $\rho$ represents an average receiving power; $H \in \mathbb{C}^{N_r \times N_t}$ represents a channel matrix; and n represents a noise vector.

Further preferably, assuming that the wireless channel is a clustered channel model, i.e. a Saleh-Valenzuela model, that multi-antenna transceivers all use a uniform linear array, and that a distance between antennas is half a wavelength, a steering vector of H is expressed as formula (III):

$$a_t(\theta_t) = \frac{1}{\sqrt{N_t}}\left[1, e^{j\pi\sin\theta_t}, \ldots, e^{j\pi(N_t-1)\sin\theta_t}\right]^T, \quad (III)$$

where $\theta_t$ represents a pointing angle of a beam.

Preferably according to the present invention, the upper bound of the integrated communication and sensing spectral efficiency of non-uniform beam spatial modulation is constructed as a target of the communication performance, which means that:

$\mathcal{F} = \{F_1, F_2, \ldots, F_K\}$ represents a set of candidate beam matrices, and the size of the set is K; $p = [p_1, p_2, \ldots, p_K]$ represents a distribution of activation probabilities of various candidate beam matrices; and the upper bound of the integrated communication and sensing spectral efficiency of the non-uniform beam spatial modulation is expressed as formula (IV):

$$\mathcal{R}^U(\mathcal{F}, p) = \sum_{i=1}^{|\mathcal{F}|} p_i\left(\text{logdet}\sum_i - \log p_i\right), \quad (IV)$$

In formula (IV), det represents a matrix determinant, $$\sum_i = \frac{\rho}{N_s}HF_iF_i^H H^H + I_{N_r};$$

and $I_{N_r}$ represents a unit matrix with a dimension of $N_r \times N_r$.

Preferably according to the present invention, the constructing an objective function of the sensing performance means that:

the sensing performance is measured by a desired similarity level, and the objective function of the sensing performance, i.e. a similarity level, is defined as formula (V):

$$\epsilon(\mathcal{F}, p) = \mathbb{E}\left(\|F_i - F_{rad}\|_F^2\right) = \sum_{i=1}^{K} p_i\|F_i - F_{rad}\|_F^2. \quad (V)$$

In formula (V), $F_{rad}$ refers to a reference beam matrix with good beam pattern characteristics, which is calculated according to a target area.

Preferably according to the present invention, the finding a candidate beam matrix and a beam activation probability distribution where the spectrum frequency is maximum and the sensing performance is best means that:

the optimization problem of $\mathcal{F}$ and p is first decoupled; a first element $F_1$ is assumed to be an optimal beam matrix; and p is optimized on the basis of the constructed $\mathcal{F}$ to obtain a more optimal solution.

Further preferably, the finding a candidate beam matrix $\mathcal{F}$ and a beam activation probability distribution P where the spectrum frequency is maximum and the sensing performance includes:

1) For optimization of $\mathcal{F}$, $F_i$ is constructed by solving formula (VI):

$$\min_{\|F_i\|_F^2 = N_s} \eta\|F_i - F_{com}^i\|_F^2 + (1-\eta)\|F_i - F_{rad}\|_F^2, \quad (VI)$$

In formula (VI), $\eta$ represents a compromise factor between communication and sensing, and $F_{com}^i$ represents an ideal beam required for an $i_{th}$ communication.

Formula (VI) is simplified to obtain formula (VII):

$$\min_{\|F_i\|_F^2 = N_s} \|AF_i - B_i\|_F^2, \quad (VII)$$

In formula (VII), there are two auxiliary matrices $A = [\sqrt{\eta}I_{N_t}^T, \sqrt{1-\eta}I_{N_t}^T]^T$ and $B_i = [\sqrt{\eta}(F_{com}^i)^T, \sqrt{1-\eta}F_{rad}^T]^T$.

The least mean square algorithm with relatively low complexity is used to solve formula (VII), as shown in formula (VIII):

$$F_i = A^\dagger B_i. \quad (VIII)$$

The solved $F_i$ is multiplied with one normalization factor $$\frac{\sqrt{N_s}}{\|F_i\|_F},$$

thus satisfying a power constraint requirement, that is, the candidate beam matrix $\mathcal{F}$ to be found.

2) For a sub-problem of the optimization of P, it is constructed as a Lagrange function, as shown in formula (IX):

$$\mathcal{L}(p, \mu) = \sum_{i=1}^{K} p_i\left(\text{logdet}\sum_i - \log p_i\right) - \mu\left(\sum_{i=1}^{K} p_i - 1\right). \quad (IX)$$

Formula (IX) is solved to obtain the beam activation probability distribution P.

Preferably according to the present invention, the finding a spectral efficiency of non-uniform beam spatial modulation by means of the ISAC beam means that: the found candidate beam matrix $\mathcal{F}$ and beam activation probability distribution P where the spectral efficiency is maximum and the sensing performance is best are substituted into formula (IV) to find the integrated communication and sensing spectral efficiency of the non-uniform beam spatial modulation.

A non-uniform beam spatial modulation system applicable to multi-antenna communication and sensing integration includes:

an ISAC beam finding unit, configured to find an ISAC beam that satisfies both sensing performance and communication performance; and a non-uniform beam spatial modulation unit, configured to find a spectral efficiency of non-uniform beam spatial modulation by means of the ISAC beam, and complete the non-uniform beam spatial modulation.

The finding an ISAC beam that satisfies both sensing performance and communication performance includes:

constructing a communication transmitting signal; constructing a communication receiving signal; constructing an upper bound of the integrated communication and sensing spectral efficiency of the non-uniform beam spatial modulation; constructing an objective function of the sensing performance; and finding a candidate beam matrix and a beam activation probability distribution where the spectrum frequency is maximum and the sensing performance is best.

The present invention has the beneficial effects below.

1. For the shortcomings of the current ISAC system, the present invention actively selects a beam according to each symbol transmission time slot. Beam numbers are selected to carry additional information, i.e. beam spatial modulation, so that the upper bound of the spectrum frequency is increased. In the present invention, the probability and information that each beam graph is activated are unique and different. In the present invention, it is proved that without losing the sensing performance, the ISAC system based on the design scheme of the present invention always has higher spectral efficiency than that of an existing ISAC scheme achieving activation in a fixed beam mode.

2. By means of modifying the compromise factor between the communication and the sensing in the system, under the condition of satisfying the communication spectral efficiency, the sensing performance of the present invention is better than that of the existing scheme, and the beam graph is closer to a reference beam graph.

DETAILED DESCRIPTION OF THE EMBODIMENTS

The present invention is further described below in combination with the drawings and embodiments of this specification, but is not limited to this.

Embodiment 1

A non-uniform beam spatial modulation method applicable to multi-antenna communication and sensing integration includes:

finding an ISAC beam that satisfies both sensing performance and communication performance; and finding a spectral efficiency of non-uniform beam spatial modulation by means of the ISAC beam, and completing the non-uniform beam spatial modulation.

The finding an ISAC beam that satisfies both sensing performance and communication performance includes:

constructing a communication transmitting signal; constructing a communication receiving signal; constructing an upper bound of the integrated communication and sensing spectral efficiency of the non-uniform beam spatial modulation; constructing an objective function of the sensing performance; and finding a candidate beam matrix and a beam activation probability distribution where the spectrum frequency is maximum and the sensing performance is best.

Embodiment 2

Figure 1:
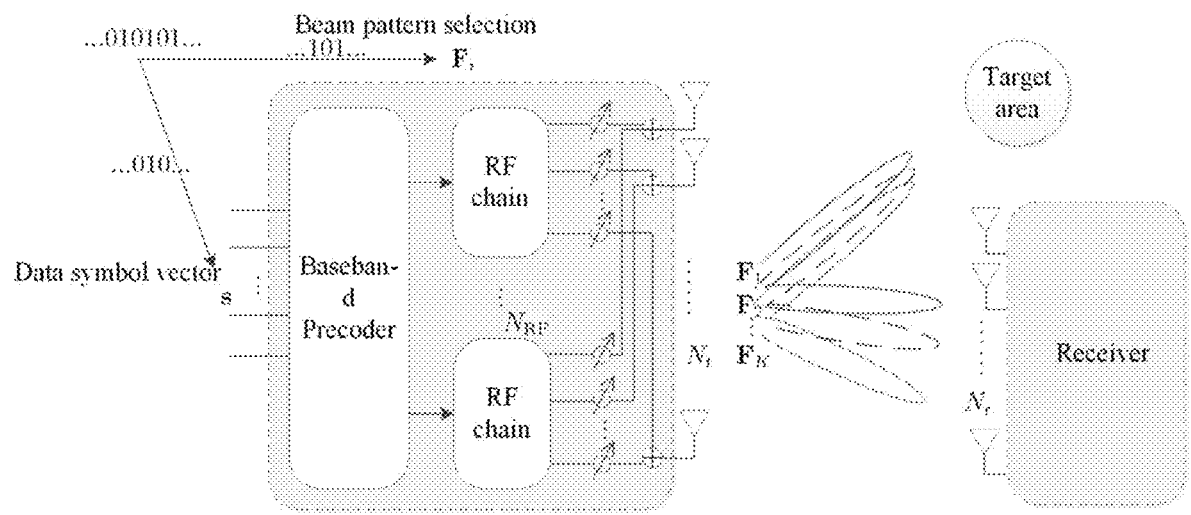
FIG. 1 is a schematic diagram of a model of an ISAC system based on non-uniform beam spatial modulation according to the present invention.

A difference from the non-uniform beam spatial modulation method applicable to multi-antenna communication and sensing integration of Embodiment 1 is as follows:

The above-mentioned non-uniform beam spatial modulation method is applicable to a multiple-input multiple-output (MIMO) communication system. As shown in FIG. 1, the MIMO communication system includes $N_t$ transmitting-side antennas and $N_r$ receiving-side antennas, and the number of data streams to be transmitted is $N_s$. A baseband processing unit is a data processing unit for processing a received signal in a base station; a radio frequency link is a radio frequency processing unit in the base station; and $N_{RF}$ represents the number of radio frequency links.

At a transmitting side, an information bit sequence b to be sent is divided into two parts: $b_1$ and $b_2$.

$b_1$ is a spatial modulation portion, which is mapped to a beam matrix $F_i \in \mathcal{F}$ with a dimension of $N_t \times N_s$; the beam matrix $F_i$ satisfies probability distribution $p(F=F_i)=p_i$; p represents a probability distribution; $F=F_i$ indicates that $F_i$ is activated; and $p_i$ is a probability that each beam matrix is activated.

A mapping process may be completed using an invariant combination in [P. Schulte and G. Böcherer, "Constant composition distribution matching," IEEE Trans. Inf. Theory, vol. 62, no. 1, pp. 430-434, 2016.] and an arithmetic coding algorithm.

$b_2$ is a data modulation portion, which is mapped to a symbol vector s with a dimension of $N_s \times 1$ by virtue of a conventional modulation method, such as source encoding and complex modulation; and s satisfies a constraint condition expectation mean $$\mathbb{E}[ss^H] = \frac{1}{N_s} I_{N_s}.$$

In order to maximize the spectral efficiency of the communication system, a data symbol in s follows a complex Gaussian distribution.

The constructing a communication transmitting signal means that once the beam matrix $F_i$ is selected, a vector of the communication transmitting signal is expressed as formula (I):

$$x = F_i s, \quad (I)$$

In formula (I), a normalized transmitting power satisfies $\|F_i\|_F^2 = N_s$.

The constructing a communication receiving signal means that the communication receiving signal received by a communication receiver through a wireless channel is expressed as formula (II):

$$y = \sqrt{\rho} H F_i s + n, \quad (II)$$

In formula (II), $\rho$ represents an average receiving power; $H \in \mathbb{C}^{N_r \times N_t}$ represents a channel matrix; and n represents a noise vector.

Assuming that the wireless channel is a clustered channel model, i.e. a Saleh-Valenzuela model, that multi-antenna transceivers all use a uniform linear array, and that a distance between antennas is half a wavelength, a steering vector of H is expressed as formula (III):

$$a_t(\theta_t) = \frac{1}{\sqrt{N_t}}\left[1, e^{j\pi \sin\theta_t}, \ldots, e^{j\pi(N_t-1)\sin\theta_t}\right]^T, \quad (III)$$

where $\theta_t$ represents a pointing angle of a beam.

The upper bound of the integrated communication and sensing spectral efficiency of non-uniform beam spatial modulation is constructed as a target of the communication performance, which means that:

In order to facilitate analyzing the spectrum frequency, $\mathcal{F} = \{F_1, F_2, \ldots, F_K\}$ represents a set of candidate beam matrices, and the size of the set is K; $p=[p_1, p_2, \ldots, p_K]$ represents a distribution of activation probabilities of various candidate beam matrices; and for ease of analysis, the upper bound $\mathcal{R}^U(\mathcal{F}, p)$ of the spectral efficiency of the beam modulation is used as the target of the communication performance. By [S. Guo, H. Zhang, and M.-S. Alouini, "Asymptotic capacity for MIMO communications with insufficient radio frequency chains," IEEE Trans. Commun., vol. 68, no. 7, pp. 4190-4201, July 2020], it can be proved that the actual spectral efficiency of the communication system in an area with a high signal noise ratio is convergent to the upper bound $\mathcal{R}^U(\mathcal{F}, p)$. Based on the above prove, the upper bound of the integrated communication and sensing spectral efficiency of the non-uniform beam spatial modulation is expressed by formula (IV):

$$\mathcal{R}^U(\mathcal{F}, p) = \sum_{i=1}^{|\mathcal{F}|} p_i \left(\log\det \sum_i - \log p_i\right), \quad (IV)$$

In formula (IV), det represents a matrix determinant, $$\sum_i = \frac{\rho}{N_s} H F_i F_i^H H^H + I_{N_r};$$

and $I_{N_r}$ represents a unit matrix with a dimension of $N_r \times N_r$.

The constructing a target function of the sensing performance means that:

In addition to a communication task, a transmitter also needs to form a beam to detect a target area and complete a sensing task. A transmitting-side steering vector in formula (III) is provided, and a target radiation in a direction can be calculated as:

$$r(\theta) = \sqrt{\rho} a_t^T(\theta) F_i s \quad (V)$$

Further, a beam transmitting power $P(\theta)$ in the direction $\theta$ can be calculated, which is expressed as:

$$P(\theta) = \mathbb{E}(|r(\theta)|^2) = \sum_{i=1}^{K} \frac{\rho p_i}{N_s} a_t^T(\theta) F_i F_i^H a_i(\theta). \quad (VI)$$

In order to better accomplish the purpose of sensing detection, it is better to concentrate the radiation energy of the transmitter on a spatial section of interest. The beam graph matrix $F_i$ should have desirable characteristics, such as a low sidelobe level. The present invention designs a reference beam matrix $F_{rad}$ with good beam pattern characteristics. $F_i$ should be close to $F_{rad}$ as much as possible to meet a sensing requirement. The sensing performance is measured by a desired similarity level, and the objective function of the sensing performance, i.e. a similarity level, is defined as formula (VII):

$$\epsilon(\mathcal{F}, p) = \mathbb{E}(\|F_i - F_{rad}\|_F^2) = \sum_{i=1}^{K} p_i \|F_i - F_{rad}\|_F^2. \quad (VII)$$

In formula (VII), $F_{rad}$ refers to a reference beam matrix with good beam pattern characteristics, which is calculated according to a target area.

The finding a candidate beam matrix and a beam activation probability distribution where the spectrum frequency is maximum and the sensing performance is best means that:

communication and sensing are jointly optimized. It can be seen from the spectral efficiency calculation formula (IV) and the sensing performance measurement indicator formula (VII) that the overall performance of the ISAC system is affected by the beam matrix $F_i$ and the beam pattern activation distribution probability p. Under a power constraint, designing $F_i$ and p is to maximize the spectral efficiency and optimize the sensing performance.

In order to obtain a superior solution that is provable and feasible at low complexity, the optimization problem of $\mathcal{F}$ and p is first decoupled. Based on this, an optimal beam given in the existing design scheme is used as an element of $\mathcal{F}$. In order to guarantee the generality, a first element $F_1$ is assumed to be an optimal beam matrix; and $K_{-1}$ matrices $F_2, \ldots, F_K$ are independent of $F_1$. Based on the constructed $\mathcal{F}$, the optimization of p will obtain a better solution. This is because the existing design is a special case, i.e. $p=[1, 0, \ldots, 0]^T$, and an optimized solution always outperforms the special solution. The following steps will describe how to design $\mathcal{F}$ and p in detail.

Figure 9:
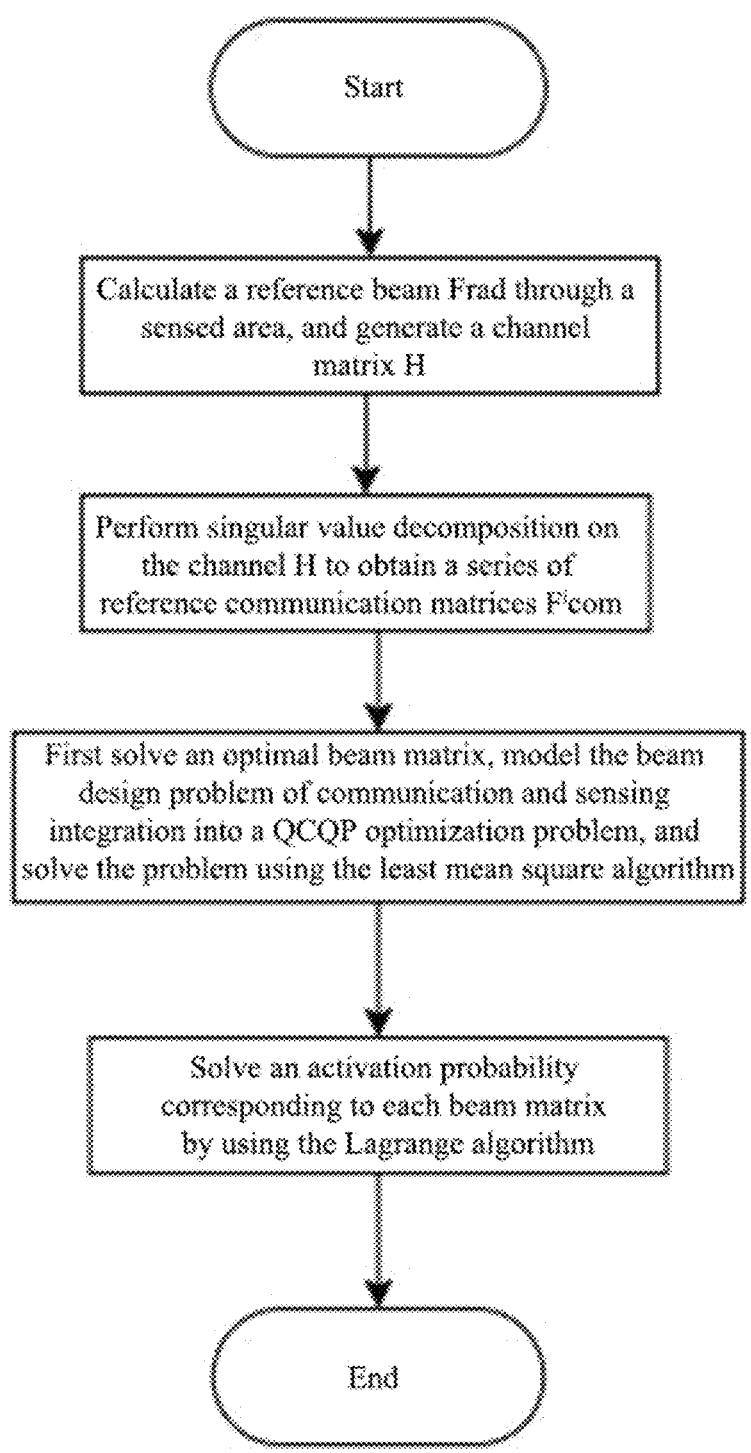
FIG. 9 is a flow chart of finding a candidate beam matrix and a beam activation probability distribution where the spectral efficiency is maximum and the sensing performance is best.

The finding a candidate beam matrix $\mathcal{F}$ and a beam activation probability distribution p where the spectrum frequency is maximum and the sensing performance is best, as shown in FIG. 9, includes:

1) For optimization of $\mathcal{F}$, $F_i$ is constructed by solving formula (VIII):

$$\min_{\|F_i\|_F^2 = N_s} \eta \|F_i - F_{com}^i\|_F^2 + (1-\eta)\|F_i - F_{rad}\|_F^2, \quad \text{(VIII)}$$

In formula (VIII), $\eta$ represents a compromise factor between communication and sensing, and is also used as a similarity of the sensing performance. $F_{com}^i$ represents a desired ideal beam of an $i_{th}$ communication, which is obtained by performing singular value decomposition on a channel.

Formula (VIII) is simplified to obtain formula (IX):

$$\min_{\|F_i\|_F^2 = N_s} \|AF_i - B_i\|_F^2, \quad \text{(IX)}$$

In formula (IX), there are two auxiliary matrices $A=[\sqrt{\eta}I_{N_t}^T, \sqrt{1-\eta}I_{N_t}^T]^T$ and $B_i=[\sqrt{\eta}(F_{com}^i)^T, \sqrt{1-\eta}F_{rad}^T]^T$.

Formula (IX) is a typical quadratically constrained quadratic program (QCQP). The least mean square algorithm with relatively low complexity is used to solve formula (IX), as shown in formula (X):

$$F_i = A^\dagger B_i. \quad \text{(X)}$$

The solved $F_i$ is multiplied with one normalization factor $$\frac{\sqrt{N_s}}{\|F_i\|_F},$$

thus satisfying a power constraint requirement, that is, the candidate beam matrix $\mathcal{F}$ to be found.

2) For a sub-problem of the optimization of p, it is constructed as a Lagrange function, as shown in formula (XI):

$$\mathcal{L}(p, \mu) = \sum_{i=1}^{K} p_i \left( \log\det \sum_i - \log p_i \right) - \mu \left( \sum_{i=1}^{K} p_i - 1 \right). \quad \text{(XI)}$$

Formula (XI) is solved to obtain the beam activation probability distribution p.

By means of the above method, the ISAC beam that satisfies both the sensing performance and the communication performance is designed.

The finding a spectral efficiency of non-uniform beam spatial modulation by means of the ISAC beam means that: the found candidate beam matrix $\mathcal{F}$ and beam activation probability distribution p where the spectral efficiency is maximum and the sensing performance is best are substituted into formula (IV) to find the integrated communication and sensing spectral efficiency of the non-uniform beam spatial modulation.

In this embodiment, it is set that the number of transmitted signal data streams is $N_s=2$, the number of transmitting-side antennas is $N_t=64$, the number of receiving-side antennas is $N_r=36$, and the number of radio frequency links is $N_{RF}=2$. An angle of an area that needs to be sensed is set to be [−30°, −60°]. A channel matrix H is a statistically independent and identically distributed complex Gaussian matrix whose elements are random variables that follow a complex Gaussian distribution with a zero mean and a unit variance, and the number of scatterers in a channel is set to be L=4.

Figure 2:
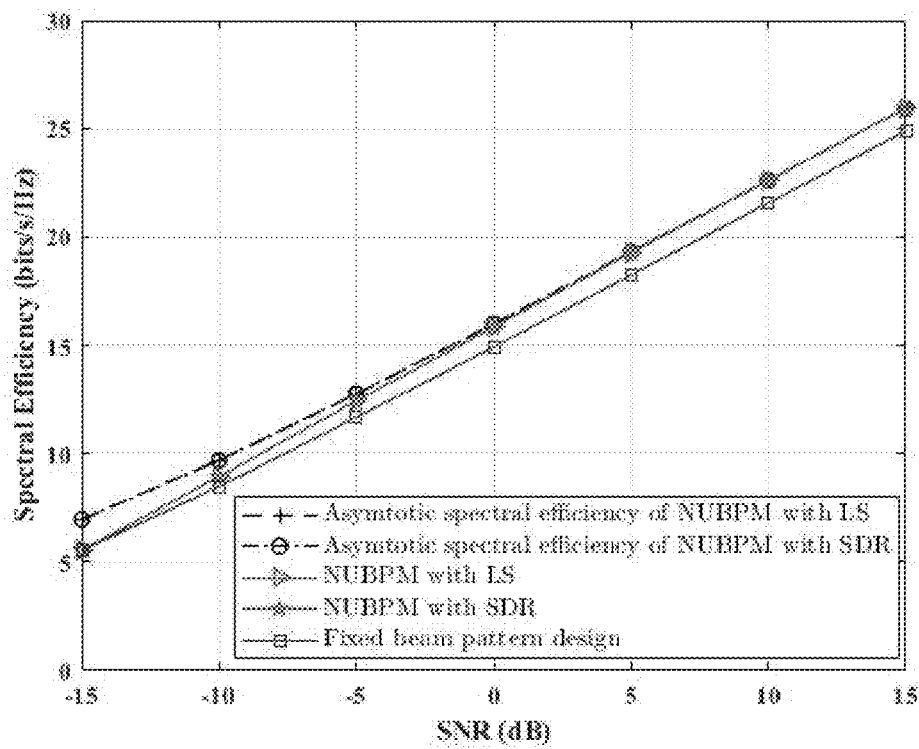
FIG. 2 is a schematic diagram of comparison between the ISAC transmission performance of a non-uniform beam spatial modulation method of the present invention and the ISAC transmission performance of a traditional method.
Figure 3:
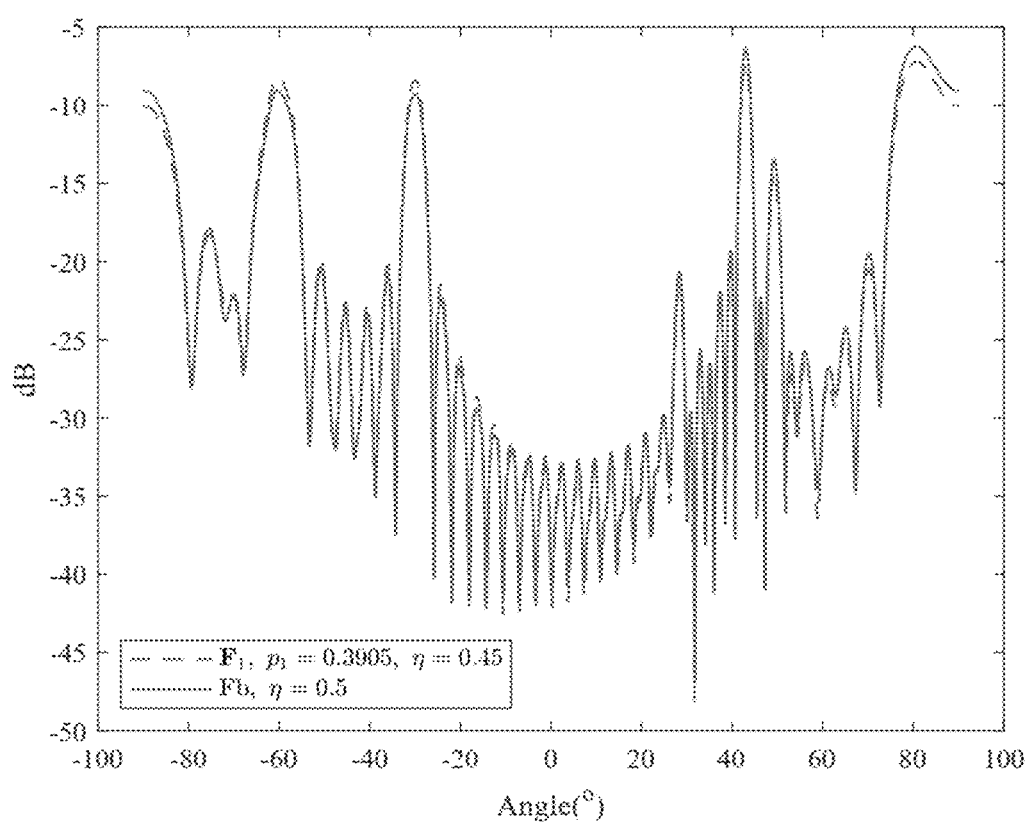
FIG. 3 is a schematic diagram of comparison between a beam $F_1$ and an optimization activation probability thereof selected by the non-uniform beam spatial modulation method of the present invention and a fixed beam in the existing scheme within coherence time.
Figure 4:
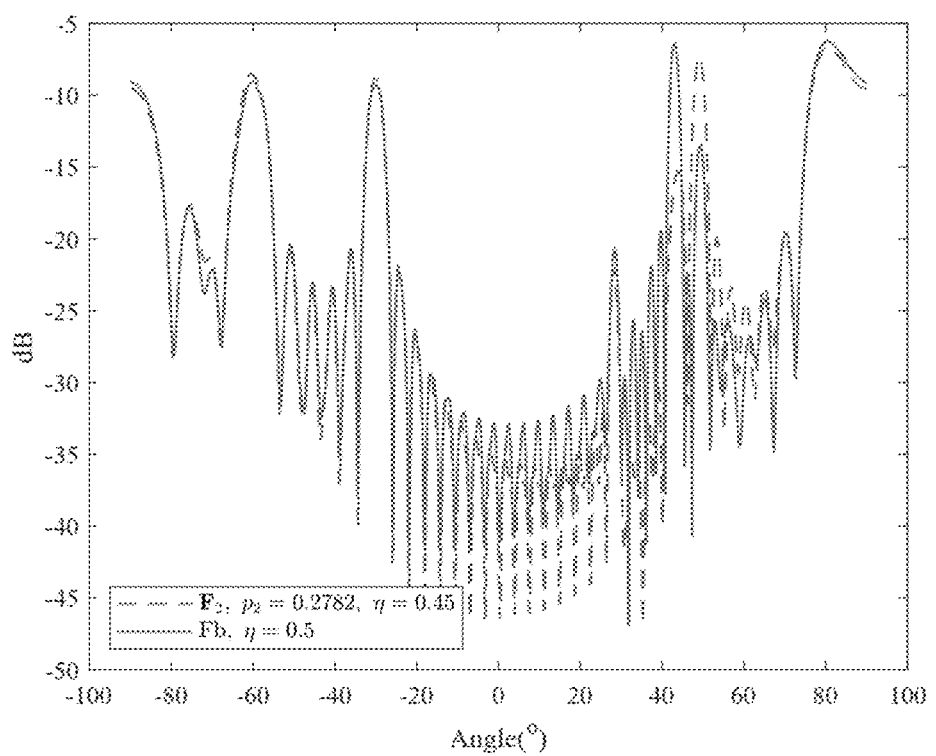
FIG. 4 is a schematic diagram of comparison between a beam $F_2$ and an optimization activation probability thereof selected by the non-uniform beam spatial modulation method of the present invention and a fixed beam in the existing scheme within coherence time.
Figure 5:
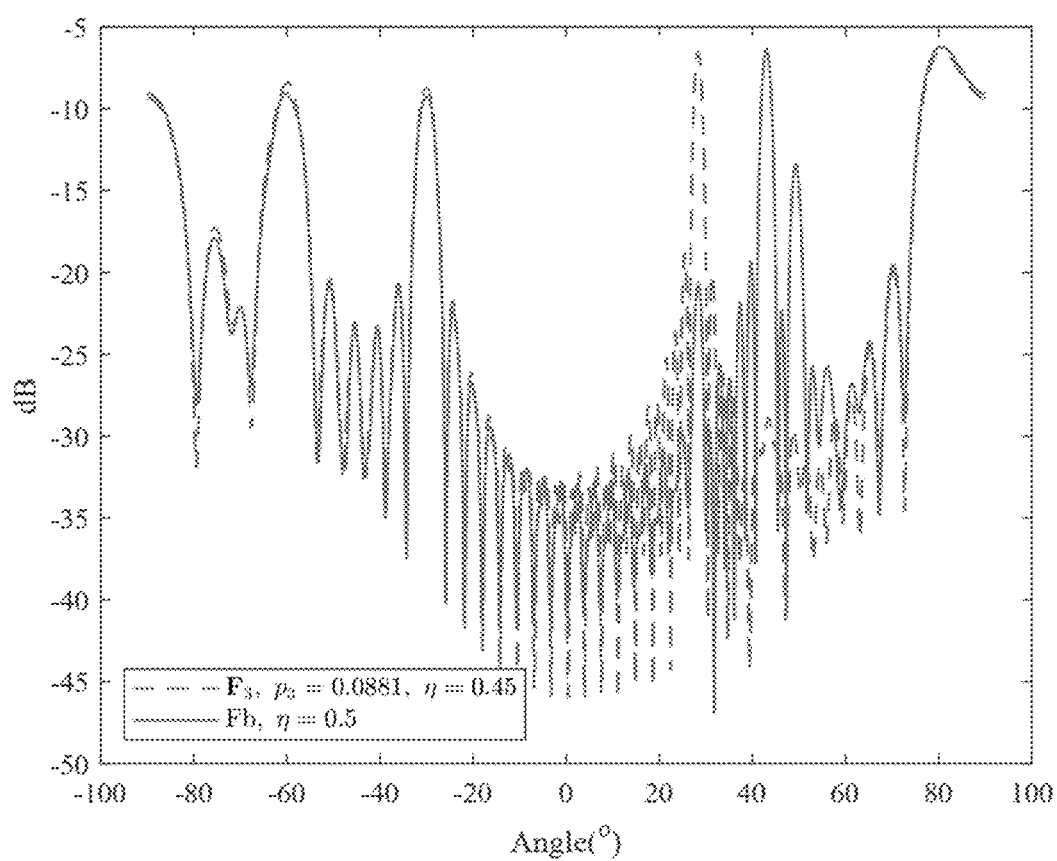
FIG. 5 is a schematic diagram of comparison between a beam $F_3$ and an optimization activation probability thereof selected by the non-uniform beam spatial modulation method of the present invention and a fixed beam in the existing scheme within coherence time.
Figure 6:
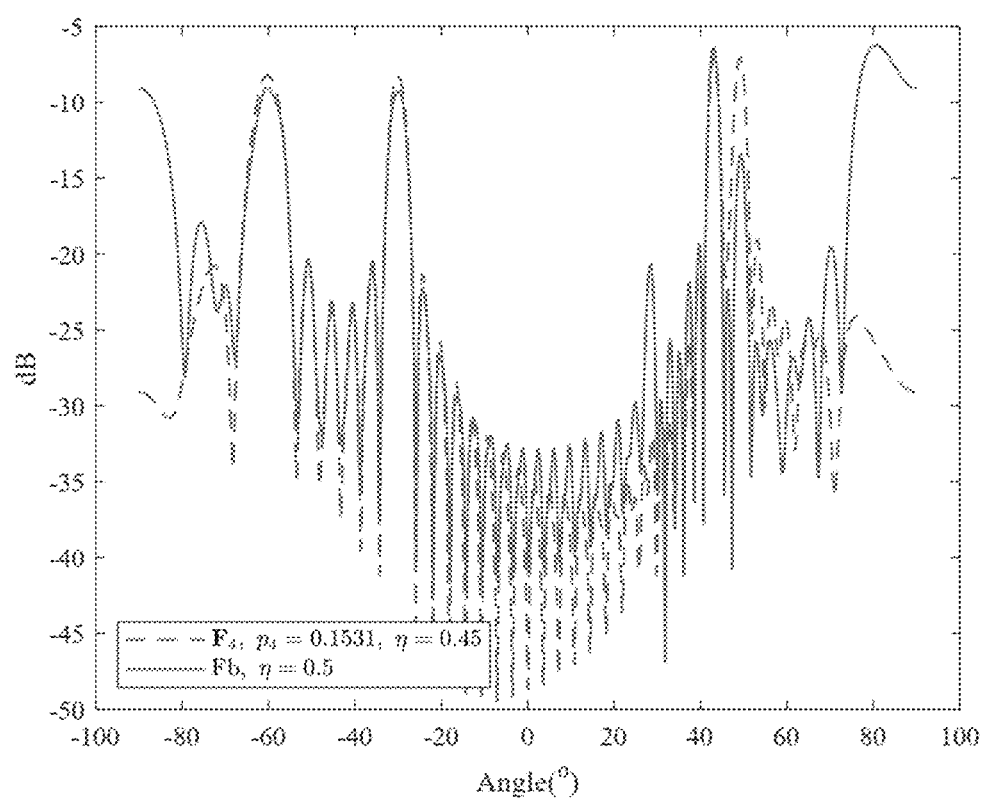
FIG. 6 is a schematic diagram of comparison between a beam $F_4$ and an optimization activation probability thereof selected by the non-uniform beam spatial modulation method of the present invention and a fixed beam in the existing scheme within coherence time.
Figure 7:
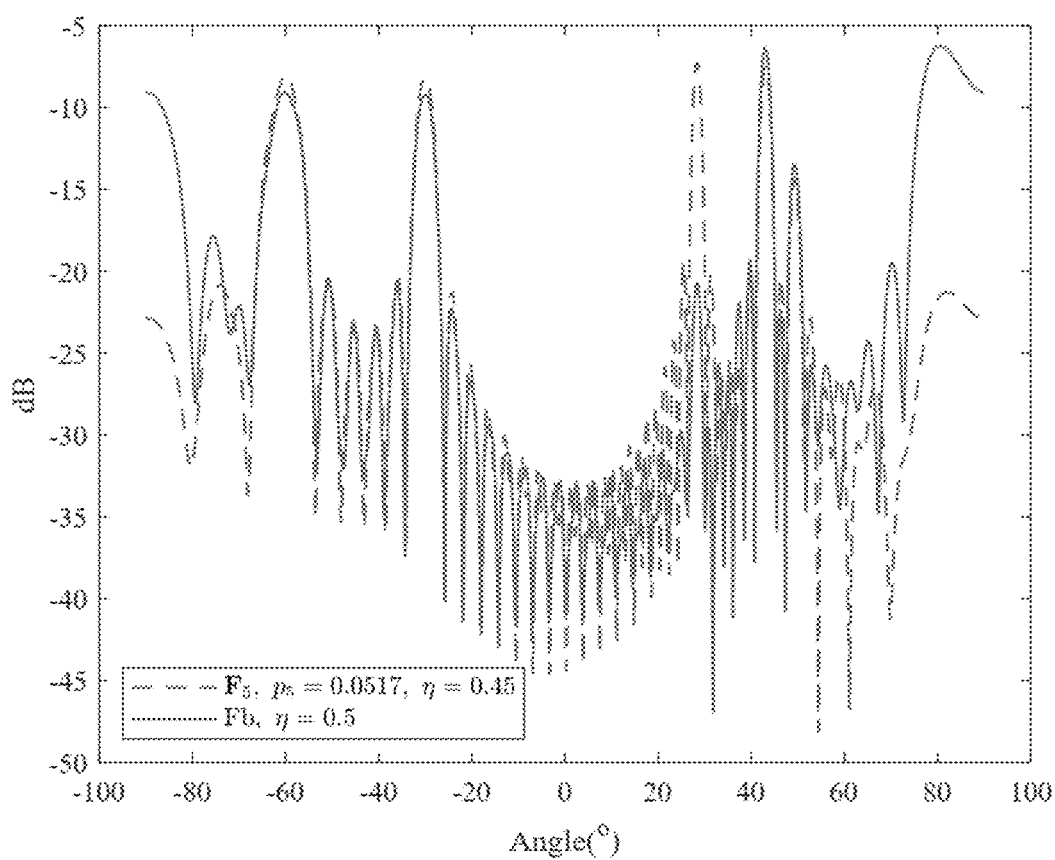
FIG. 7 is a schematic diagram of comparison between a beam $F_5$ and an optimization activation probability thereof selected by the non-uniform beam spatial modulation method of the present invention and a fixed beam in the existing scheme within coherence time.
Figure 8:
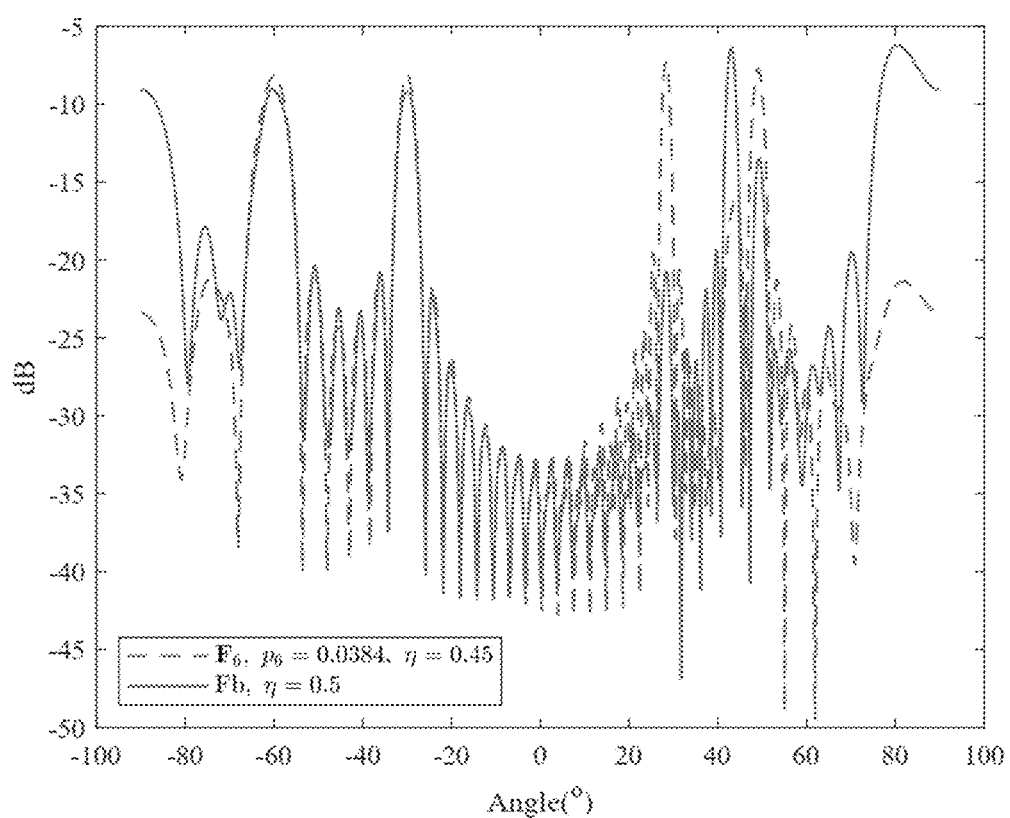
FIG. 8 is a schematic diagram of comparison between a beam $F_6$ and an optimization activation probability thereof selected by the non-uniform beam spatial modulation method of the present invention and a fixed beam in the existing scheme within coherence time.

The communication performance of the ISAC is evaluated from the two aspects: the spectral efficiency and the upper bound of a spectrum. FIG. 2 is a schematic diagram of comparison between the transmission performance of a non-uniform beam spatial modulation method of the present invention and the transmission performance of a traditional method. The x-coordinate is a signal noise ratio (SNR) in dB.

The y-axis is the spectral efficiency, which is defined as being obtained by dividing a net bit rate (useful information rate, excluding error correction codes) or a maximum throughput divided by a bandwidth (in Hertz) of a communication channel or data link. The compromise coefficient between communication and sensing is set to be 0.5; LS represents the least mean square error method; and SDR represents the semidefinite relaxation. It can be seen from FIG. 2 that the spectral efficiency of the non-uniform beam spatial modulation method of the present invention is higher than that of the existing ISAC beam forming design. In an area with a high SNR, the spectral efficiency of the scheme of the present invention is improved by 1 bit/s/Hz compared with that of the existing scheme. This is because in the scheme of the present invention, beams are selected to carry information other than data symbols, thereby improving the spectral efficiency. In contrast, information bits in the existing scheme can only be carried by data symbols. In addition, different methods are compared in this scheme of the present invention to solve formula (IX), and the QCQP may also be solved using the classical SDR method. It can be seen from FIG. 2 that the spectral efficiencies obtained by the two methods are the same, but the calculation complexity of the LS method in the scheme of the present invention is lower.

FIG. 3, FIG. 4, FIG. 5, FIG. 6, FIG. 7, and FIG. 8 are schematic diagrams of comparison between beams $F_1$, $F_2$, $F_3$, $F_4$, $F_5$, $F_6$ and optimization activation probabilities thereof selected by the non-uniform beam spatial modulation method of the present invention and a fixed beam in the existing scheme within coherence time. The x-coordinate represents an azimuth angle in degrees (°), and the y-coordinate represents a beam graph gain in dB. In given system settings, the candidate beam set has six beams, i.e. $F_1$, $F_2$, $F_3$, $F_4$, $F_5$, and $F_6$. FIG. 3 to FIG. 8 sequentially represent the six beams after beam selection in the beam design scheme of the present invention. The activation probabilities for the six beams are optimized to be 0.3905, 0.2782, 0.0881, 0.1531, 0.0517, and 0.0384, respectively. In FIG. 3 to FIG. 8, $F_b$ represents a scenario of a fixed beam in the existing scheme within coherent time, and η represents the compromise coefficient between communication and sensing. The standard for evaluating the ISAC sensing performance is whether a beam graph is close to a reference beam graph. It can be seen from the comparison that by modifying the compromise factor under the condition of satisfying the same communication spectral efficiency, a peak point of the beam graph of the design scheme of the present invention is slightly higher than that of the existing scheme in −30° and −60° directions. With reference to the simulation results in FIG. 3 to FIG. 8, it can be seen that the integrated communication and sensing beam design scheme based on non-uniform beam spatial modulation provided by the present invention can be superior to the existing beam design scheme in terms of communication performance and sensing performance.

Embodiment 3

A non-uniform beam spatial modulation system applicable to multi-antenna communication and sensing integration includes:

an ISAC beam finding unit, configured to find an ISAC beam that satisfies both sensing performance and communication performance; and a non-uniform beam spatial modulation unit, configured to find a spectral efficiency of non-uniform beam spatial modulation by means of the ISAC beam, and complete the non-uniform beam spatial modulation.

The finding an ISAC beam that satisfies both sensing performance and communication performance includes:

constructing a communication transmitting signal; constructing a communication receiving signal; constructing an upper bound of the integrated communication and sensing spectral efficiency of the non-uniform beam spatial modulation; constructing an objective function of the sensing performance; and finding a candidate beam matrix and a beam activation probability distribution where the spectrum frequency is maximum and the sensing performance is best.

What is claimed is:

1. A non-uniform beam spatial modulation method applicable to multi-antenna communication and sensing integration, comprising:

finding an Integrated Sensing and Communication (ISAC) beam that satisfies both sensing performance and communication performance; and finding a spectral efficiency of non-uniform beam spatial modulation by using the ISAC beam, and completing the non-uniform beam spatial modulation, wherein the finding the ISAC beam that satisfies both sensing performance and communication performance comprises:

constructing a communication transmitting signal; constructing a communication receiving signal; constructing an upper bound of an integrated communication and a sensing spectral efficiency of the non-uniform beam spatial modulation; constructing an objective function of the sensing performance; and finding a candidate beam matrix and a beam activation probability distribution where a spectrum frequency is maximum and the sensing performance is best;

the non-uniform beam spatial modulation method is applicable to a multiple-input multiple-output communication system, the multiple-input multiple-output communication system includes $N_t$ transmitting-side antennas and $N_r$ receiving-side antennas, and a number of data streams to be transmitted is $N_s$;

at a transmitting side, an information bit sequence b to be sent is divided into two parts: $b_1$ and $b_2$;

$b_1$ is a spatial modulation portion, which is mapped to a beam matrix $F_i \in \mathcal{F}$ with a dimension of $N_t \times N_s$; the beam matrix $F_i$ satisfies probability distribution $p(F=F_i)=p_i$; i represents a number of an i-th beam matrix F; p represents a probability distribution; $F=F_i$ indicates that $F_i$ is activated; $p_i$ is a probability that each beam matrix is activated;

$b_2$ is a data modulation portion, which is mapped to a symbol vector s with a dimension of $N_s \times 1$; and s satisfies a constraint condition expectation mean $$\mathbb{E}[ss^H] = \frac{1}{N_s}I_{N_s};$$

the constructing the communication transmitting signal, once the beam matrix $F_i$ is selected, a vector of the communication transmitting signal is expressed as formula (I):

$$x=F_i s, \qquad (I)$$

in formula (I), a normalized transmitting power satisfies $\|F_i\|_F^2 = N_s$;

the constructing the communication receiving signal, the communication receiving signal received by a communication receiver through a wireless channel is expressed as formula (II):

$$y=\sqrt{\rho}HF_i s+n, \qquad (II)$$

in formula (II), ρ represents an average receiving power; $H \in \mathbb{C}^{N_r \times N_t}$ represents a channel matrix; and n represents a noise vector;

the upper bound of the integrated communication and sensing spectral efficiency of non-uniform beam spatial modulation is constructed as a target of the communication performance, wherein $\mathcal{F} = \{F_1, F_2, \ldots, F_K\}$ represents a set of candidate beam matrices, and a size of the set is K; $p=[p_1, p_2, \ldots, p_K]$ represents a distribution of activation probabilities of various candidate beam matrices; and the upper bound of the integrated communication and sensing spectral efficiency of the non-uniform beam spatial modulation is expressed as formula (IV):

$$\mathcal{R}^U(\mathcal{F}, p) = \sum_{i=1}^{|\mathcal{F}|} p_i \left( \text{logdet} \sum_i - \log p_i \right), \qquad (IV)$$

in formula (IV), det represents a matrix determinant, $$\sum_i = \frac{\rho}{N_s} HF_j F_i^H H^H + I_{N_t};$$

and $I_{N_r}$ represents a unit matrix with a dimension of $N_r \times N_r$;

constructing a target function of the sensing performance:

the sensing performance is measured by a desired similarity level, and the objective function of the sensing performance, a similarity level, is defined as formula (V):

$$\epsilon(\mathcal{F}, p) = \mathbb{E}(\|F_i - F_{rad}\|_F^2) = \sum_{i=1}^{K} p_i \|F_i - F_{rad}\|_F^2. \quad (V)$$

in formula (V), $F_{rad}$ refers to a reference beam matrix with good beam pattern characteristics, which is calculated according to a target area;

the finding the candidate beam matrix $\mathcal{F}$ and the beam activation probability distribution p where the spectrum frequency is maximum and the sensing performance is best:

1) For optimization of $\mathcal{F}$, $F_i$ is constructed by solving formula (VI):

$$\min_{\|F_i\|_F^2 = N_s} \eta \|F_i - F_{com}^i\|_F^2 + (1-\eta)\|F_i - F_{rad}\|_F^2, \quad (VI)$$

in formula (VI), $\eta$ represents a compromise factor between communication and sensing, and $F_{com}^i$ represents an ideal beam required for an ith communication;

formula (VI) is simplified to obtain formula (VII):

$$\min_{\|F_i\|_F^2 = N_s} \|AF_i - B_i\|_F^2, \quad (VII)$$

in formula (VII), there are two auxiliary matrices $A=[\sqrt{\eta}I_{N_t}]^T$ and $B_i=[\sqrt{\eta}(F_{com}^i)^T, \sqrt{1-\eta}F_{rad}^T]^T$;

the least mean square algorithm with relatively low complexity is used to solve formula (VII), as shown in formula (VIII):

$$F_i = A^\dagger B_i. \quad (VIII)$$

the solved $F_i$ is multiplied with one normalization factor $$\sqrt{\frac{N_s}{\|F_i\|_F}},$$

thus satisfying a power constraint requirement, that is, the candidate beam matrix $\mathcal{F}$ to be found;

2) For a sub-problem of an optimization of p, it is constructed as a Lagrange function, as shown in formula (IX):

$$\mathcal{L}(p, \mu) = \sum_{i=1}^{K} p_i(\log \det \Sigma_i - \log p_i) - \mu\left(\sum_{i=1}^{K} p_i - 1\right). \quad (IX)$$

formula (IX) is solved to obtain the beam activation probability distribution p;

the finding the spectral efficiency of non-uniform beam spatial modulation using the ISAC beam, wherein the found candidate beam matrix $\mathcal{F}$ and beam activation probability distribution p where the spectrum frequency is maximum and the sensing performance is best are substituted into formula (IV) to find the integrated communication and sensing spectral efficiency of the non-uniform beam spatial modulation.

2. The non-uniform beam spatial modulation method applicable to multi-antenna communication and sensing integration according to claim 1, wherein assuming that the wireless channel is a clustered channel model, a Saleh-Valenzuela model, that multi-antenna transceivers all use a uniform linear array, and that a distance between antennas is half a wavelength, a steering vector of H is expressed as formula (III):

$$a_t(\theta_t) = \frac{1}{\sqrt{N_t}}\left[1, e^{j\pi \sin\theta_t}, \ldots, e^{j\pi(N_t-1)\sin\theta_t}\right]^T, \quad (III)$$

where $\theta_t$ represents a pointing angle of a beam.

* * * * *